May 12, 1964     A. B. WESTERLIND     3,132,551
RING FIXTURE
Filed Feb. 7, 1962     4 Sheets-Sheet 1
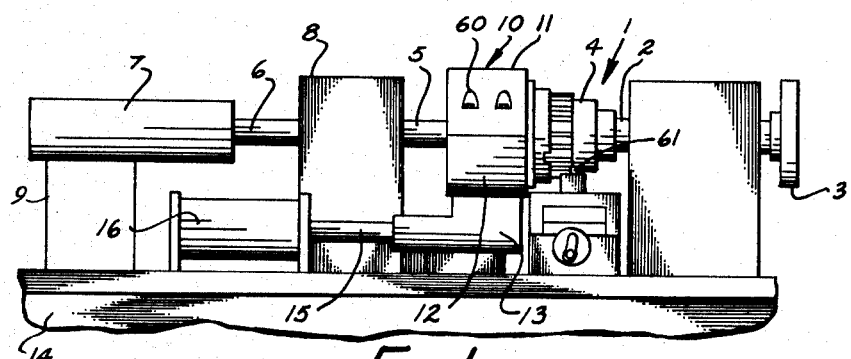
FIG. 1
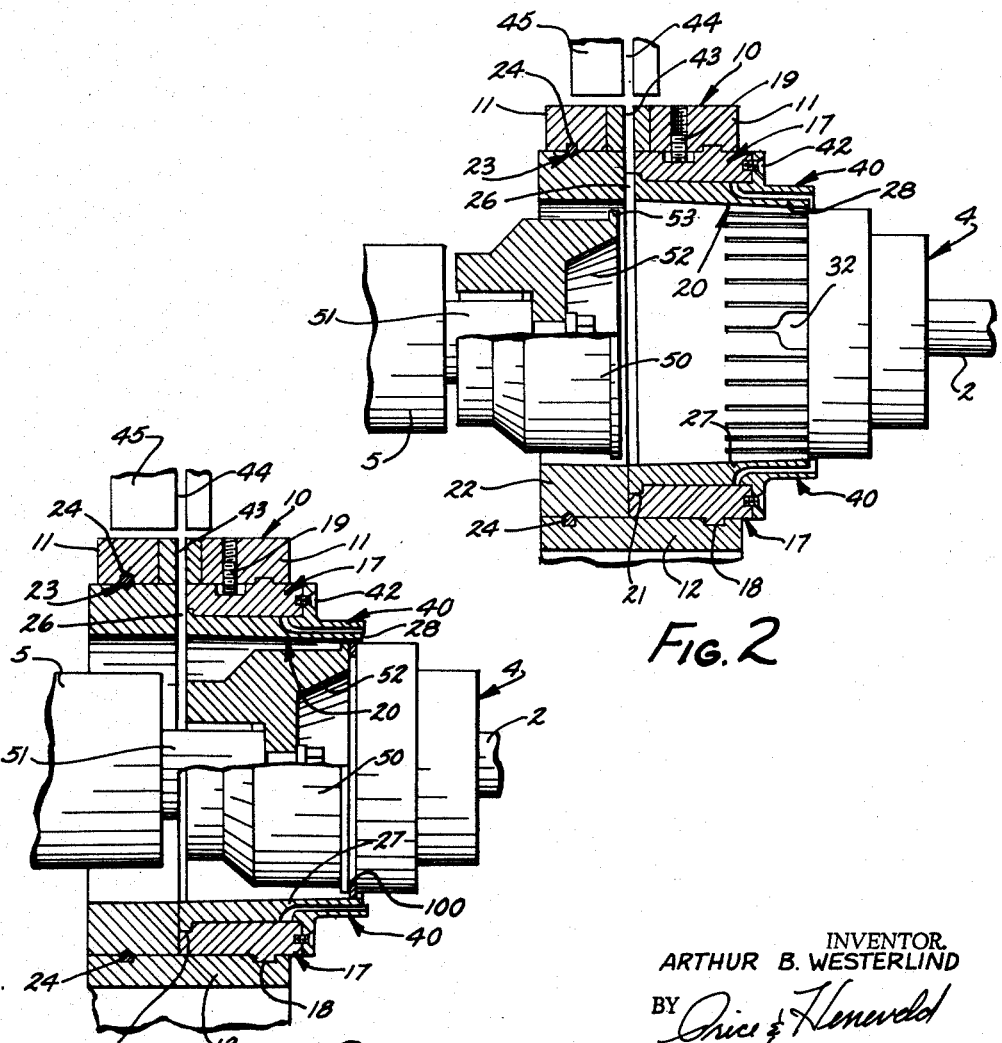
FIG. 2
FIG. 3
INVENTOR.
ARTHUR B. WESTERLIND
BY
ATTORNEYS

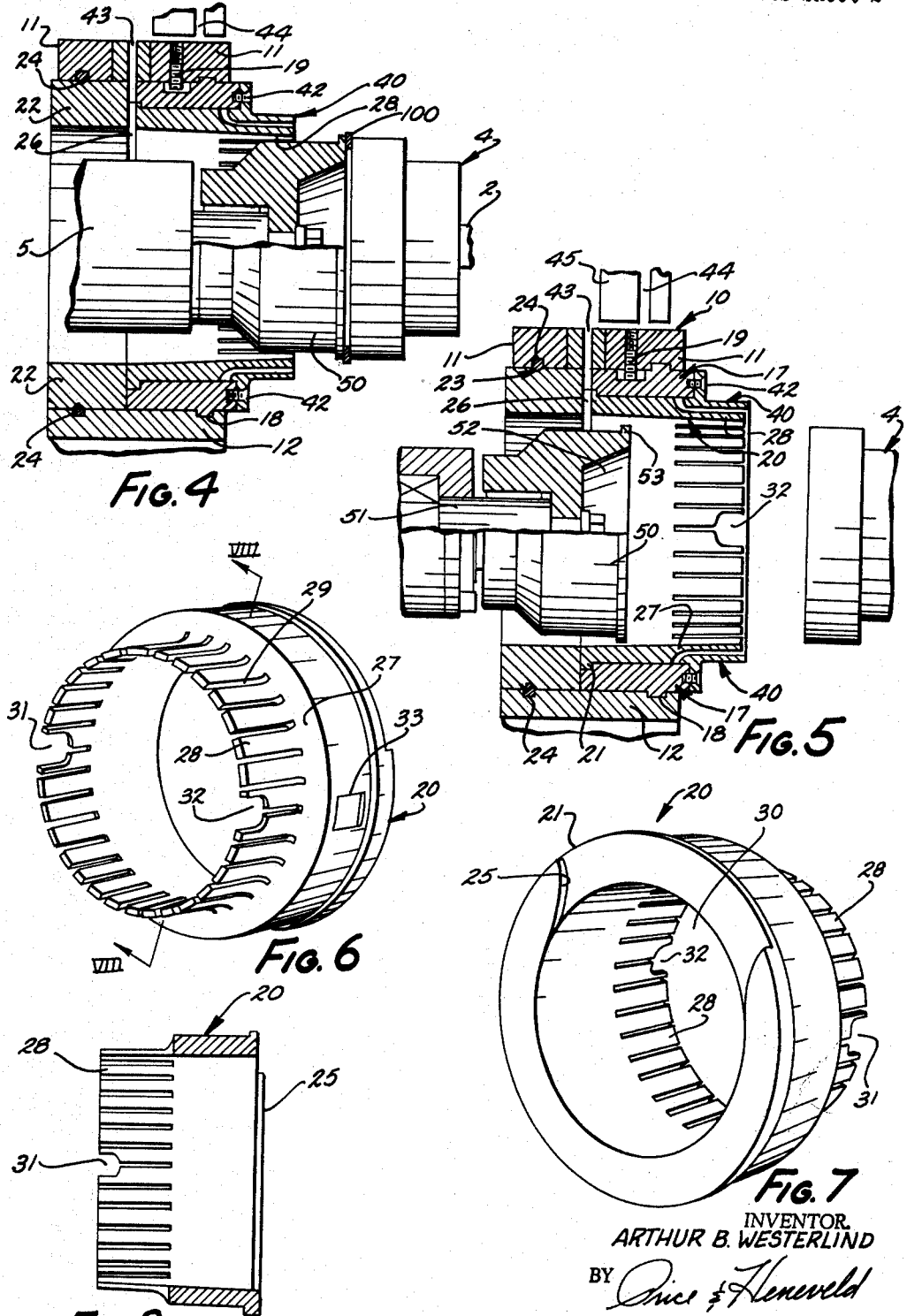

May 12, 1964   A. B. WESTERLIND   3,132,551
RING FIXTURE
Filed Feb. 7, 1962   4 Sheets-Sheet 3

INVENTOR.
ARTHUR B. WESTERLIND
BY
ATTORNEYS

# United States Patent Office 3,132,551
Patented May 12, 1964

3,132,551
RING FIXTURE
Arthur B. Westerlind, Montague, Mich., assignor to Muskegon Piston Ring Company, Muskegon, Mich.
Filed Feb. 7, 1962, Ser. No. 171,748
7 Claims. (Cl. 82—2.5)

This invention relates to industrial machining equipment, and particularly to a fixture for locating piston rings for machining on the outside diameter.

One of the final machining operations performed on a piston ring is to machine or turn the O.D. of the ring. This operation is performed not only to make the ring perfectly circular, but also to increase the uniformity of radial pressure exerted by the ring when it is closed. The conventional piston ring is fabricated of a material such as cast iron or steel having some degree of resiliency. It is parted and at the part has a gap. The ring is designed to form a perfect circle when the part is closed, which is the condition it attains when it is seated in operating position in a cylinder.

It is most important to the proper functioning of a piston ring that the radial pressure exerted by the ring be uniform throughout its circumference. This is necessary to assure uniform seating against the cylinder walls and thus sealing at all points about the ring.

Lack of uniformity in the radial pressure exerted by the ring arises from more than one condition. This makes the problem of attaining uniformity complex. It may arise from variation in radial wall depth of the ring at various points around the ring. Areas of greater thickness may produce areas of greater radial pressure.

This, however, is complicated by the fact that the internal structure of the ring, such as the crystal structure or lack of uniformity in the distribution of the alloying metals, may have an effect equal to or dominant over that of the actual wall thickness of the ring. Thus, there may be areas where the ring will exhibit excessive radial pressure even though the wall thickness of the ring is normal or even less than normal. The reverse is true with the ring exhibiting in some cases subnormal radial pressure even though the radial wall thickness is excessive. It will be understood from this explanation that if the ring is closed by confining it within a rigid fixture and machined to remove the high points which determine the greatest O.D. of the ring after closure in such a fixture, the resulting removal of material will not necessarily create uniformity of radial pressure in the finished ring.

The conventional practice for finish turning or machining the O.D. of a piston ring is that of forcing the ring through a rigid fixture of such inside diameter that the ring is closed. The ring in the closed condition is then locked in position and the tool moved across its face to remove those portions of the ring which project beyond a predetermined radius from the center of rotation of the ring during machining. In view of the above explanation of the causes of variation in ring tension, it will be obvious that such an operation will not eliminate variations in radial pressure. The best it can do is to reduce the more excessive discrepancies from the desired norm and when the condition of the ring is adverse, it may increase the lack of uniformity.

This invention provides a solution to this problem by closing the ring in such a manner that the ring is allowed to assume the shape it naturally takes as the result of the amount of radial pressure it exerts at various points about its circumference. Thus, a portion of the ring having higher radial pressure than other portions of the ring will tend to shift outwardly and become a bump in the outer face of the ring. Areas of the ring having less than normal radial pressure will not have this tendency and therefore will not move as far. Thus, the shape of the ring after closing is dictated by the variations in radial pressure.

Where the radial pressure is significantly higher on one side of the ring than on the other, the ring may shift eccentrically of the center of the fixture which locates it on the machine. By this invention, sufficient radially inwardly directed pressure is applied to the ring to cause it to close and this pressure is applied uniformly at a large number of closely spaced points around the circumference of the ring. Further, pressure is applied by a plurality of fingers, each applying it at one of the closely spaced points. Each of the fingers is capable of adjusting its position relative to every other finger. To this extent the application of pressure at each point is independent of the application of pressure at each adjacent point. The pressure applied at all points collectively is only sufficient to close the ring but at each point of application is insufficient to resist outward moving of portions of the circumference of the ring in response to the radial pressure of the ring. Thus, the ring assumes its natural shape as dictated by the inherent variations in radial pressure and is not forced to distort from this pattern. The closed ring having been allowed to assume its natural shape, is clamped and then machined to a uniform diameter. The result of this machining is to give the ring a substantially uniform radial pressure throughout its entire circumference.

The result of the application of the invention is a piston ring of greater uniformity of radial pressure. The ring has substantially improved sealing characteristics.

These and other objects and purposes of this invention will be immediately understood by those acquainted with the design and manufacture of piston rings upon reading the following specification and the accompanying drawings.

In the drawings:

FIG. 1 is a side elevational view of a machine equipped with this invention;

FIG. 2 is a fragmentary, enlarged, central, sectional view of the ring positioning and holding portion of a machine equipped with this invention showing the machine in ring receiving position;

FIG. 3 is a view identical to FIG. 2, showing the machine in advanced, ring clamping position;

FIG. 4 is a view identical to FIG. 2, showing the machine in advanced position with the ring positioning fixture retracted to permit machining of the ring to be executed;

FIG. 5 is a view identical to FIG. 2, showing the machine in retracted, ring releasing position;

FIG. 6 is an oblique front view of the ring positioning fixture;

FIG. 7 is an oblique rear view of the ring positioning fixture;

FIG. 8 is a central, sectional view of the ring positioning fixture taken along the plane VIII—VIII of FIG. 6;

Figure 9:
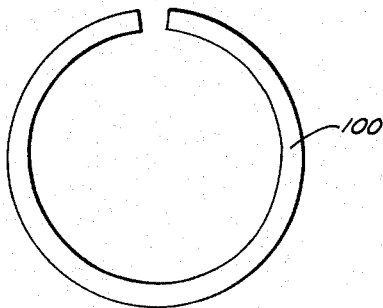
FIG. 9 is a view of a parted piston ring in free state.

In executing the objects and purposes of this invention, there has been provided a piston ring fixture through which rings are forced to close them. This fixture positions them for machining. The internal bore of the fixture is tapered so that the part in the ring is closed as the ring is forced through the fixture. The end of the fixture of least diameter is subdivided into a large number of circumferentially equally spaced, independent, resilient fingers each of which may flex radially independently of adjacent fingers. These, collectively, provide the closing pressure for the ring while permitting the ring to assume its natural shape in accordance with the forces generated by the structure of the ring.

Referring specifically to the drawings, the numeral 1 refers to a machine tool having a spindle 2 driven from any suitable source connected to the pulley 3. Any other suitable means may be provided to drive the spindle 2. Mounted on the spindle 2 is a head 4. Axially aligned and concentric with the spindle 2 is a tail stock or shaft 5. The shaft 5 is connected for axial reciprocation to the piston rod 6 of the actuating cylinder 7. The cylinder 7 is secured to the base 14 by a post 9. It is supported for sliding movement by the base 8. Seated about the shaft 5 is a holder 10 having an upper half 11 and a lower half 12. The holder is secured to the support 13 which is slidably supported on the bed 14. The support 13 is connected to the piston rod 15 of the actuator 16. The support 13 is mounted for reciprocal sliding movement parallel to the axis of the spindle 2 and shaft 5.

Mounted in the forward part of the holder 10 is a finger sleeve adapter 17. It is locked to the holder by the key 18 (FIG. 2). The finger sleeve adapter 17 is an annulus held against rotation by the setscrew 19. Seated within the finger sleeve adapter 17 is the fixture collar or finger sleeve 20. The finger sleeve 20, at its rearward end, has an outwardly, radially projecting flange 21 which seats in a matching annular channel in the rearward face of the finger sleeve adapter 17.

The finger sleeve 20 is locked against axial movement by the back-up ring 22. The back-up ring has an external V-shaped groove 23 for the reception of the locator pins 24 mounted in the top and bottom halves 11 and 12 of the holder 10. These hold the back-up ring 20 against axial shift. The back-up ring 22 seats against the rear face of the finger sleeve 20 and, together with the engagement between the flange 21 and the finger sleeve adapter 17, holds the finger sleeve against axial movement.

The rearward face of the finger sleeve 20 has a U-shaped wall 25, opening upwardly (FIG. 7) to define a ring receiving channel 26 (FIG. 2). The U-shaped wall 25 may be a separate piece secured to the body of the finger sleeve 20 or integral with it.

The forward end of the finger sleeve 20 is of reduced outer diameter, creating a shoulder 27 approximately midway between the forward and rearward ends of the sleeve. The portion of the sleeve projecting forwardly from the shoulder 27 is divided into a plurality of fingers 28, separated from each other by narrow channels 29. Each finger 28 has one end integral with the main body of the sleeve and a free end at the forward face of the sleeve. A large number of the fingers 28 are provided. Each one is resilient so that it may flex radially. Collectively, they define the forward portion of the inside diameter of the bore opening 30 which extends through the sleeve 20. In two places the forward ends of the fingers are removed to provide an opening 31 to receive the machining tool and an opening 32 to receive a safety gauge for detecting the presence of broken rings.

The inside bore of the sleeve 30 is tapered with its least diameter at the forward end. At the rearward end, the bore 30 is large enough to receive a parted ring in its expanded or free state, such as the ring 100 illustrated in FIG. 9. The bore at the forward end is of the same or slightly smaller diameter than the ring 100 when closed, or as illustrated in FIG. 9. The strength and flexibility of the fingers is such that collectively they apply sufficient pressure to the ring to close the part but no more. They are not strong enough to force the ring to distort from the natural shape it assumes by reason of the variations in strength which exists in various segments of the ring when it is introduced into the finger sleeve.

Surrounding the forward end of the finger sleeve 20 is a safety sleeve 40. The safety sleeve is an annulus having an inside diameter larger than the outside diameter of the forward portion of the finger sleeve 20, creating a clearance between the fingers 28 and the safety sleeve 40. This is necessary to permit the fingers 28 to flex outwardly for accommodating the piston rings. The safety sleeve has a radially extending flange 41 seated against the forward end of the finger sleeve adapter 17. The safety sleeve 40 is secured to the finger sleeve adapter 17 by suitable means such as the screws 42.

The upper half 11 of the holder 10 defines a ring receiving channel 43. In one position of the holder 10, the channel aligns with a channel 44 in the ring supply mechanism 45. The ring supply mechanism is of a type designed to automatically introduce rings one by one to the holder through the channel 43. Further description of the ring supplying mechanism is not considered necessary since a number of conventional devices suitable for this purpose may be employed with this invention.

Axially slidable through both the back-up ring 22 and the finger sleeve 20 is a pressure pad 50. The pressure pad is mounted on a stub shaft 51 which in turn is rotatably mounted in the end of the shaft 5 (FIG. 2). The forward end of the pressure pad 50 has a concentric depression 52, surrounded by an annular flange 53. The annular flange 53 provides the clamping surface for holding the rings against the head 4.

ASSEMBLY

The lower half 12 of the holder 10 is secured to the support 13 by any suitable means such as bolts. The finger sleeve adapter 17, safety sleeve 40, and the finger sleeve 20 are assembled and placed in the lower half 12 of the holder 10. The key 18 locates this assembly with relation to the holder. The depression for the setscrew 19 is located at the top, thus orienting it circumferentially. The finger sleeve 20 is secured against rotation by a setscrew in the finger sleeve adapter 17 (not illustrated) which engages the seat 33 (FIG. 6) in the side face of the finger sleeve. The back-up ring 22 is placed in position on the lower half of the holder 10. It is located axially by the pin 24 in the lower half 12 of the holder. The upper half 11 of the holder 10 is then placed in position and secured to the lower half 12 by bolts 60 on each side (FIG. 1). The setscrew 19 is then tightened, readying the assembly for operation.

OPERATION

To permit the finger sleeve 20 to receive a ring, the pressure pad 50 is retracted so that its forward face is rearward of the ring channel 44 in the ring supply 45 (FIG. 2). The holder 10, together with the equipment mounted on it, is in its forward position where the forward end of the finger sleeve 20 extends to or slightly overlaps the head 4. In this position, ring channels 43 and 44 are aligned. The ring is then passed down through the channels 43 and 44 by the ring supply device 45 and comes to rest on the wall 25 of the finger sleeve 20. The ring, as received in the rearward end of the finger sleeve 20, is open, as illustrated in FIG. 9. The actuator 7 is then operated to shift the piston 6 forwardly, driving the pressure pad 50 forwardly through the finger sleeve.

The forward movement of the pressure pad 50 forces the ring through the bore of the finger sleeve 20 and against the head 4 (FIG. 3). The taper of the bore closes the ring by the time the ring seats against the head 4. The pressure exerted by the actuator 7 holds the ring firmly against the head 4. The actuator 16 is then retracted to withdraw the holder 10, shifting the finger sleeve 20 and safety sleeve 40 rearwardly, exposing the ring (FIG. 4). The head 4 is then rotated to rotate the ring while a suitable machining tool 61 (FIG. 1) is moved across the outer face of the ring to machine it. When the ring has been turned or machined, the pressure pad 50 is shifted rearwardly once more to the position illustrated in FIG. 5. This releases the ring and it is dropped into a suitable receiving device.

The holder 10 and the equipment mounted on it is then once again shifted forwardly to the position shown in FIG. 2 ready for the next ring. This move, once again, shifts the ring receiving channel 43 into alignment with the channel 44 and just forward of the pressure pad 50. The tool opening 31 in the forward end of the finger sleeve 20 permits the finger sleeve to move to this position without interference with the tool. The opening 32 in the forward end of the finger sleeve 20 permits a detection gauge to contact the ring. The use of this type of gauge is optional but it is desirable since it will immediately detect a broken ring when rotation of the head is initiated. This is a safety device to protect the tool and is not an essential part of this invention.

Figure 10:
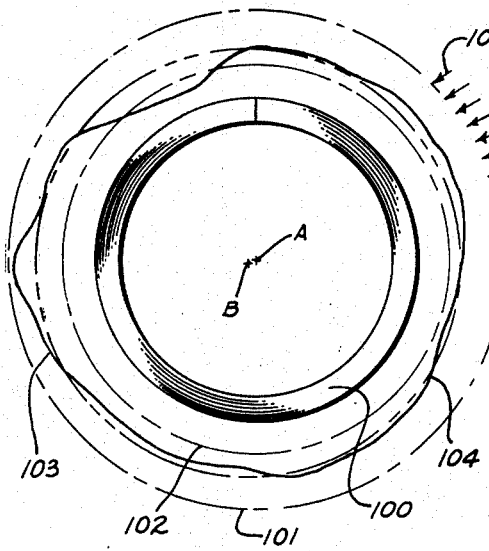
FIG. 10 is a schematic view showing the ring of FIG. 8 closed and illustrating a theoretical pattern of forces as they might exist in a particular ring after closure in a fixture incorporating this invention.

As the ring is shifted forwardly through the finger sleeve 20, the decreasing taper of the bore 30 of the finger sleeve closes the ring. The closing pressure is exerted by the individual fingers 28. It will be seen that this pressure is applied at a large number of points equally spaced about the circumference of the ring. The finger sleeve 20 is so made that each of the fingers exerts the same radial pressure upon the ring, applying the closing pressure uniformly about the ring. Further, each finger 28 is free to operate independently so that this pressure is applied from a number of independent sources, as indicated schematically in FIG. 10 by the arrows 101. Each arrow 101 indicates a line of force as it is applied by one of the fingers 28. The fingers 28 are resilient and the radial closing pressure they exert is limited to that necessary to close the ring. Thus, wherever the ring exerts resistance greater than the closing pressure exerted by a finger, that finger will fail to move inwardly to its normal position. Thus, the finger or fingers subject to this type of resistance from the ring will spring out enough to allow the ring in such an area to assume its natural shape in response to the greater resistance to radial compression characteristic of that portion of the ring. This is illustrated in FIG. 10 schematically. In this figure, the line 102 is a perfect circle and illustrates an average of all values of radial tension exhibited by the ring. It will be noted that the line 102 is a perfect circle generated about the center A which is the center of rotation of the head 4 and pressure pad 50 and is the reference point for the tool 61. It would also be the physical center of the ring 100 if the ring were uniform about its circumference. The irregular line 103 schematically presents the actual radial forces exhibited by the ring. In the case of both the lines 102 and 103, the magnitude of the force is considered as represented by the radial distance of each of the lines from the center A. It will be noted that the line 103 about the circumference of the ring deviates erratically and substantially from the line 102. It will be understood that the line 103 illustrates a theoretical condition on one particular ring and that the shape and pattern of the line 103 will vary from ring to ring. It will also be noted that the line 103 shows radial pressure forces in one sector of the ring which are substantially greater than the theoretical value represented by the line 102 whereas in other sectors these forces are less than that of the theoretical value represented by the line 102. When the ring is closed, the ring, being free except for the compressive forces exerted by the fingers 28 collectively, will assume an erratic shape in response to those forces.

In the particular condition illustrated in FIG. 10, the components of excessive force are largely concentrated to the left of the center A. Therefore, the line 104 is a circle representing the same value as line 102 but relocated to represent a stabilized balance of forces between the summation of forces exerted by the fingers 28 and a summation of the forces exerted by the ring 100. The stabilization of the summations of these forces produces a circle offset slightly to the left of the line 102. The circle 104 has its center at B which is offset slightly to the left of the center point A for the circle 102 and thus also offset from the reference point of operation of the cutting tool. Thus, as the ring is rotated against the cutting tool, the outside of the ring will be cut to a perfect circle generated about the center A, which, being offset from the center B, will result in the removal of more material on the left side of the center point A than on the right side, the material removal being on an average representative of the departure to the left of the line 104 from the line 102. The result of this operation is the removal of material in greater quantities in those areas where the ring exhibits excessive radial tension and a decrease in the removal of material in those areas where the ring exhibits lesser values of radial pressure. The end result is a ring of substantially more uniform radial pressure characteristics than has been obtained by any other method of machining.

The marked improvement in uniformity of radial tension is illustrated by the following examples.

*Example I*

In this example six cast iron, production piston rings having a 3½ inch O.D. and 5/64 inch width were used. These rings were selected at random from the same production run. Three of these rings were machined in a machine equipped with a ring closing and positioning fixture of rigid construction. The remaining three rings were machined on the same machine equipped with a fixture constructed according to the invention disclosed above. After machining, the rings were each placed in a gauge designed for measuring radial pressure and the radial pressure of each ring was measured in pounds at 40 separate points equally spaced about the ring. The results of both machining operations are graphically illustrated in FIGS. 11 and 12. The values from which the charts of FIGS. 11 and 12 were prepared appear in the following tables.

TABLE I

Figure 11:
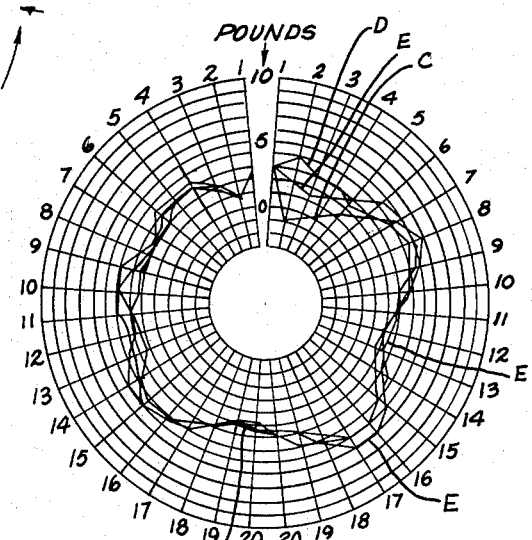
FIG. 11 is a graphic representation of the radial tension measurements of a group of three rings machined by conventional methods.

[This table presents the values developed from those rings machined by conventional equipment and methods (Fig. 11). The values appearing in columns 2, 3, 4, 6, 7 and 8 are radial pressure expressed in pounds]

| Measurement, Points [1] | Ring C, Pounds | Ring D, Pounds | Ring E, Pounds | Measurement, Points [2] | Ring C, Pounds | Ring D, Pounds | Ring E, Pounds |
|---|---|---|---|---|---|---|---|
| 1 | 3 | 3 | 3 | 20 | 2.5 | 2 | 2.6 |
| 2 | −1.5 | 4 | 2 | 19 | 2 | 2 | 2.5 |
| 3 | −1 | 3 | 1.5 | 18 | 3 | 3 | 3 |
| 4 | 0 | 3 | 2 | 17 | 4 | 3.5 | 4 |
| 5 | 1.5 | 2.5 | 3 | 16 | 4.5 | 4.5 | 4.5 |
| 6 | 2.5 | 3 | 4.5 | 15 | 5 | 4.9 | 4.4 |
| 7 | 4.5 | 4 | 4.9 | 14 | 5 | 4 | 4 |
| 8 | 5.5 | 4.5 | 4.9 | 13 | 4 | 2.5 | 3.5 |
| 9 | 5 | 4 | 4.5 | 12 | 3 | 2.5 | 3.5 |
| 10 | 3.7 | 3.5 | 3 | 11 | 3 | 3 | 3.9 |
| 11 | 3 | 2.5 | 2.5 | 10 | 2.5 | 4 | 3.9 |
| 12 | 2.5 | 2 | 2 | 9 | 2.5 | 4 | 3 |
| 13 | 2.4 | 1.5 | 2.4 | 8 | 2 | 3 | 2.5 |
| 14 | 3.5 | 2.5 | 3 | 7 | 2.5 | 2 | 2.5 |
| 15 | 4.5 | 4 | 5 | 6 | 3.5 | 2.5 | 3 |
| 16 | 5 | 5 | 5.9 | 5 | 3.5 | 3 | 3.1 |
| 17 | 5 | 5 | 5.9 | 4 | 3.5 | 3 | 3.1 |
| 18 | 4 | 4.5 | 4.5 | 3 | 2.5 | 2 | 2.5 |
| 19 | 3 | 4 | 3 | 2 | 0 | 1 | 1 |
| 20 | 2.5 | 3 | 2.5 | 1 | 2.5 | 3 | 3 |

[1] In Fig. 11 reading clockwise from top to bottom.
[2] In Fig. 11 reading clockwise from bottom to top.

TABLE II

Figure 12:
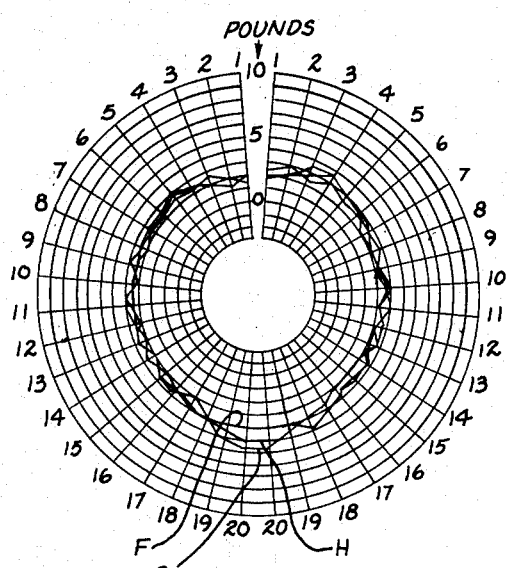
FIG. 12 is a graphic representation of the radial tension measurements of a group of three rings identical to those used for the measurements in FIG. 11 but machined in accordance with this invention.

[This table presents the values developed from those rings machined by equipment utilizing this invention (Fig. 12). The values appearing in columns 2, 3, 4, 6, 7 and 8 are radial pressure expressed in pounds]

| Measurement, Points [1] | Ring F, Pounds | Ring G, Pounds | Ring H, Pounds | Measurement, Points [2] | Ring F, Pounds | Ring G, Pounds | Ring H, Pounds |
|---|---|---|---|---|---|---|---|
| 1 | 2 | 2 | 2.5 | 20 | 3 | 4.6 | 3.9 |
| 2 | 2.4 | 2.4 | 3 | 19 | 3 | 4 | 3.5 |
| 3 | 3.5 | 3.5 | 2.5 | 18 | 3 | 3 | 3 |
| 4 | 3.5 | 3.5 | 3 | 17 | 2 | 3 | 3 |
| 5 | 3 | 3 | 2.5 | 16 | 2.5 | 2.6 | 2.5 |
| 6 | 3 | 3 | 2.5 | 15 | 2.5 | 2.6 | 2 |
| 7 | 2 | 2 | 2.5 | 14 | 2.5 | 2 | 2 |
| 8 | 2 | 2 | 2 | 13 | 2 | 2.5 | 2 |
| 9 | 2 | 2 | 2.1 | 12 | 2 | 2.5 | 2.5 |
| 10 | 2.5 | 2.5 | 2.7 | 11 | 2.5 | 2.5 | 3 |
| 11 | 2.5 | 2.5 | 2.7 | 10 | 2.5 | 2.4 | 2.3 |
| 12 | 2.5 | 2.5 | 2 | 9 | 3 | 2.5 | 2.4 |
| 13 | 2.5 | 2.5 | 1.9 | 8 | 2.5 | 2.5 | 2 |
| 14 | 2.5 | 2 | 2.5 | 7 | 2.5 | 2.4 | 2.5 |
| 15 | 2.5 | 2 | 2.5 | 6 | 2.5 | 2.4 | 2.5 |
| 16 | 2.5 | 2 | 2.5 | 5 | 3 | 2.5 | 3.2 |
| 17 | 3 | 2.5 | 3 | 4 | 2.5 | 2.5 | 2.5 |
| 18 | 3.5 | 3 | 3.6 | 3 | 2 | 2.5 | 1.8 |
| 19 | 3 | 3.5 | 3.9 | 2 | 2 | 2 | 1.5 |
| 20 | 3 | 4.5 | 3.9 | 1 | 1.6 | 2 | 2 |

[1] In Fig. 12 reading clockwise from top to bottom.
[2] In Fig. 12 reading clockwise from bottom to top.

The rings C, D and E were machined by conventional methods. The wide variation in the radial pressure around each of the rings C, D and E is obvious where ring C, for example, at one point shows a radial pressure value of −1.5 pounds and in an adjacent area shows a radial pressure value of 5.5 pounds. The radial pressure then drops to 2.4 pounds then rises to 4.5 pounds and once again drops to 2.5 pounds. Thus, there is a total variation in a single ring of 7 pounds of radial pressure, all of which occurs in a mere 180 degrees of the ring. Ring D shows a variation as wide as 5 pounds and ring E of 4.9 pounds. The average variation for all three rings is 5.63 pounds.

By way of contrast, FIG. 12 presents the radial pressure values of the three rings F, G and H machined in accordance with this invention. Here it will be seen that the three rings have significantly more uniformity of radial pressure, the values, except for one point, varying within a narrow range of one and one to two pounds. The maximum variation is 2.6 pounds (ring G). The other rings F and H have maximum variations of 1.9 pounds and 2.4 pounds respectively. The average variation for all three rings is 2.3 pounds. Therefore, it will be seen that this invention reduces the variation in radial pressure to substantially less than one-half of the value attained by conventional methods. Further, it will be noted that throughout a substantial portion of the ring the values remain within a 1.5 pound variation. Thus, the test indicates a marked improvement in the uniformity of physical characteristics of the rings when the present invention is substituted for conventional equipment.

Example II

In this example three cast iron, production piston rings having a 3¾ inch O.D. and 5/64 inch width were used. These rings were selected at random from the same production run. Each of these rings was measured for radial pressure at 48 separate equally spaced points about their circumference. These rings were then finished turned on a machine equipped with a fixture constructed according to the invention disclosed above. After machining, the rings were again placed in a gauge designed for measuring radial pressure and the radial pressure of each ring was measured in pounds at the same 48 separate points about the ring. The results of both measuring operations are graphically illustrated in FIGS. 13 and 14. The values from which the charts of FIGS. 13 and 14 were prepared appear in the following tables.

TABLE III

Figure 13:
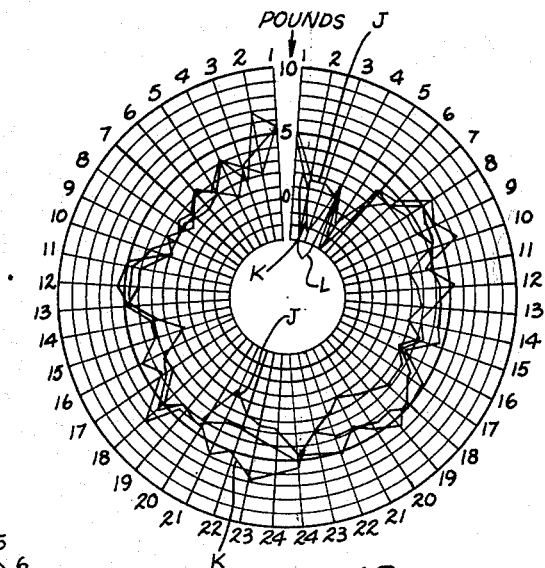
FIG. 13 is a graphic representation of the radial tension measurements of a second group of three rings before machining.

[This table presents the values developed from measurements of the rings before finish turning (FIG. 13). The values appearing in columns 2, 3, 4, 6, 7, and 8 are radial pressure expressed in pounds]

| Measurement, Points [1] | Ring J, Pounds | Ring K, Pounds | Ring L, Pounds | Measurement, Points [2] | Ring J, Pounds | Ring K, Pounds | Ring L, Pounds |
|---|---|---|---|---|---|---|---|
| 1 | 5 | 4.5 | 5 | 24 | 3 | 6.5 | 4.5 |
| 2 | 1.5 | 1 | 0 | 23 | 3 | 7 | 4 |
| 3 | 1.5 | 0 | −4.8 | 22 | 2.5 | 5.5 | 3.5 |
| 4 | 1 | 2 | 2 | 21 | 1 | 6 | 3.5 |
| 5 | −3.2 | 0 | −1 | 20 | 4 | 4.5 | 4.5 |
| 6 | 1.5 | 3 | 3 | 19 | 4 | 4 | 4.5 |
| 7 | 3 | 3.5 | 3 | 18 | 6 | 5.5 | 7.5 |
| 8 | 5 | 6 | 3.5 | 17 | 3.5 | 3 | 4 |
| 9 | 4.5 | 5 | 3.5 | 16 | 3 | 3 | 5 |
| 10 | 4.5 | 6.5 | 4.5 | 15 | 1 | 3 | 3.3 |
| 11 | 2 | 3 | 3.5 | 14 | 3 | 3 | 3.2 |
| 12 | 2.5 | 5.5 | 4.5 | 13 | 5 | 4.5 | 4.5 |
| 13 | 3 | 4 | 4.5 | 12 | 5.5 | 4 | 4.5 |
| 14 | 2 | 3 | 4.5 | 11 | 5 | 4 | 4.5 |
| 15 | 3.5 | 3.5 | 5 | 10 | 2 | 2 | 3.5 |
| 16 | 2 | 2 | 2.5 | 9 | 2 | 3 | 1.8 |
| 17 | 4 | 3 | 5 | 8 | 2 | 1.8 | 2.5 |
| 18 | 5 | 3 | 5.5 | 7 | 1.5 | 2.5 | 2 |
| 19 | 6 | 2.5 | 4.5 | 6 | 1.6 | 3 | 3 |
| 20 | 5 | 2 | 4.5 | 5 | 2 | 2.2 | 2.5 |
| 21 | 4 | 1.5 | 4 | 4 | 1 | 3.8 | 4 |
| 22 | 5.5 | 2.5 | 4 | 3 | 3 | 1.5 | 3 |
| 23 | 5 | 3 | 3.5 | 2 | 2.1 | 6.5 | 4 |
| 24 | 5 | 6 | 5.5 | 1 | 5.5 | 5.5 | 5 |

[1] In Fig. 13 reading clockwise from top to bottom.
[2] In Fig. 13 reading clockwise from bottom to top.

TABLE IV

Figure 14:
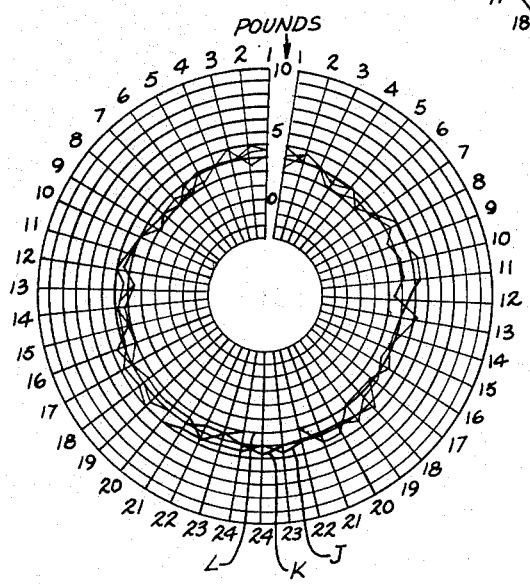
FIG. 14 is a graphic representation of the radial tension measurements after machining in accordance with this invention of the same three rings, the pre-machining radial tension measurements as illustrated in FIG. 13.

[This table presents the values developed from measurements of the rings after finish turning with equipment employing this invention (Fig. 14). The values appearing in columns 2, 3, 4, 6, 7 and 8 are radial pressure expressed in pounds]

| Measurement, Points [1] | Ring J, Pounds | Ring K, Pounds | Ring L, Pounds | Measurement, Points [2] | Ring J, Pounds | Ring K, Pounds | Ring L, Pounds |
|---|---|---|---|---|---|---|---|
| 1 | 3.4 | 3.6 | 2.5 | 24 | 4.5 | 4 | 3.1 |
| 2 | 3.5 | 3 | 3.5 | 23 | 4.5 | 3.5 | 3.5 |
| 3 | 2.9 | 3 | 3 | 22 | 4.5 | 4.5 | 3.6 |
| 4 | 2 | 2.5 | 3 | 21 | 3.5 | 4.5 | 4 |
| 5 | 2 | 3 | 3 | 20 | 3.5 | 5 | 4 |
| 6 | 2.4 | 3 | 2.1 | 19 | 3.5 | 5 | 4.6 |
| 7 | 2.5 | 3 | 2.8 | 18 | 3.6 | 4.5 | 4 |
| 8 | 3.4 | 4 | 3 | 17 | 4 | 5 | 4 |
| 9 | 3 | 4 | 3 | 16 | 3.5 | 4.1 | 4.5 |
| 10 | 3.1 | 4.5 | 2.9 | 15 | 3.5 | 4.1 | 3.5 |
| 11 | 3 | 4.5 | 2.9 | 14 | 4 | 3.9 | 3.5 |
| 12 | 2.5 | 3.6 | 2.9 | 13 | 3.5 | 3 | 2.9 |
| 13 | 4.4 | 3.1 | 2.9 | 12 | 4 | 3.5 | 2.9 |
| 14 | 3.7 | 3 | 2.9 | 11 | 3.6 | 3.1 | 2.9 |
| 15 | 3 | 3 | 2.8 | 10 | 3 | 3.1 | 2.9 |
| 16 | 3.4 | 3 | 2.9 | 9 | 2.6 | 2 | 2.4 |
| 17 | 3 | 3 | 3.5 | 8 | 2.5 | 2.5 | 2.3 |
| 18 | 4.5 | 3.1 | 3.5 | 7 | 2.5 | 2 | 2 |
| 19 | 4 | 3.1 | 4.5 | 6 | 2 | 2.5 | 3 |
| 20 | 4 | 4 | 4.2 | 5 | 3 | 2.5 | 3 |
| 21 | 4 | 3.9 | 4.3 | 4 | 3 | 3 | 3 |
| 22 | 4 | 3.8 | 3.1 | 3 | 3 | 3 | 4 |
| 23 | 4.5 | 4 | 3 | 2 | 4 | 3.5 | 2.5 |
| 24 | 4 | 4.5 | 3 | 1 | 3.5 | 3.5 | 3 |

[1] In Fig. 14 reading clockwise from top to bottom.
[2] In Fig. 14 reading clockwise from bottom to top.

Before finish machining it will be noted that the rings have a wide variation in radial pressure. It will be seen that the ring J, for example, varies from a value below that of −4.8 pounds to 7.5 pounds. Ring K varies from a value of 0 pounds to a value of 7.0 pounds and ring J varies from −3.2 pounds to 6.0 pounds. For all three rings, the average variation in radial pressure is about 9.5 pounds.

FIG. 14 and Table IV clearly show improvement in radial pressure obtained by application of this invention. After finish machining, the maximum variation for any of the rings is three pounds (ring K). Rings J and L have maximum variations of 2.5 pounds and 2.6 pounds respectively. The average variation for all three rings is 2.7 pounds. This represents a reduction in the average variation in radial pressure of approximately 71.6% of the average variation prior to finish machining. It is also significant that the average variation in radial pressure after machining with this invention is less than 50% of the variation exhibited by rings machined by conventional equipment and methods. This is illustrated by the average of 5.63 pounds found in Table I as compared with the average of 2.3 pounds found in Table II and 2.7 pounds found in Table IV.

It will be understood from the above description and from the examples that this invention, while simple and readily applicable to the machining of piston rings, produces a marked improvement in the uniformity and quality of the end product. It will be understood that while a preferred embodiment of this invention has been illustrated and described that modifications may be made which will incorporate the principle of the invention. Such of these modifications as employ the principle of the invention are to be considered as included in the hereinafter appended claims unless these claims by their language expressly state otherwise.

I claim:

1. A fixture for machining parted piston rings comprising: an annular body having a piston ring receiving central bore and a pluarlity of axially extending resilient fingers projecting from one end thereof, circumferentially of said one end, a plurality of said fingers being provided in each quadrant thereof; said fingers each having a free end and being arranged in closely spaced relationship entirely around the circumference of said fixture and each at its end being radially movable independently of all other fingers; said central bore being tapered and having its lesser diameter at said free ends of said fingers; said bore at its end of greatest diameter being of greater diameter than the outside diameter of the piston rings to be received therein when said rings are in a free state and at said free ends of said fingers when said fingers are in a free state having a diameter no larger than the outside diameter of the piston rings to be received therein when said piston rings are sufficiently restrained to effect closure of the part therein; said plurality of independently resiliently movable fingers being capable of defining a generally circular pattern characterized by irregularities in the radius of said pattern permitting them to apply positive closing pressure to a ring having such irregular circumferential shape when closed.

2. A fixture for closing and positioning parted piston rings for machining comprising: an annular body having a piston ring receiving tapered central bore; a portion of said body being divided into a plurality of axially extending resilient fingers, circumferentially of said one end, a plurality of said fingers being provided in each quadrant thereof; each of said fingers having a free end, said free ends collectively forming one end of said body and each being radially movable independently of all other fingers; the diameter of said central bore at said other end being greater than the outside diameter of the piston rings received therein when the piston rings are in a free state and the diameter of said central bore at said one end when said fingers are in a free state being less than the outside diameter of the piston rings when they are sufficiently restrained to effect closure of the part therein whereby parted piston rings passed through said bore are closed and placed under circumferential compression; said plurality of independently resiliently movable fingers being capable of defining a generally circular pattern characterized by irregularities in the radius of said pattern permitting them to apply positive closing pressure to a ring having such irregular circumferential shape when closed.

3. A machine for turning the outer diameter of a parted piston ring, said machine comprising: a rotatable head having a face; an annular collar having a central bore axially aligned with said head, the end of said collar directed toward said head having a plurality of resilient axially extending fingers each having a free end proximate said head; said bore being tapered; said free ends of said fingers having a bore diameter less than the outer diameter of a piston ring when the piston ring is sufficiently restrained to effect closure of the part therein and the other end of said bore having a diameter greater than the outer diameter of a piston ring when the piston ring is in a free state; means for advancing a piston ring axially through said collar to seat against said head and for clamping the piston ring to said head, said fingers resiliently clamping the piston ring and positioning it with respect to the axis of rotation of said head in response to the radial tension exerted by each segmental portion of the piston ring contacted by one of said fingers; means for withdrawing said collar from the piston ring; and tool means for machining the outer diameter of the piston ring.

4. In a machine for turning the outer diameter of a parted piston ring, said machine having a rotatable head, said head having a ring receiving face and means for advancing and clamping piston rings against said face and a tool for machining the piston rings while clamped against said head, the improvement comprising: a collar coaxial with said head and having one end directly toward said face, said collar having a tapered bore, said one end of said collar in one position being advanced toward said head to be at least co-planar with it; said one end of said collar having a plurality of independently radially movable resilient elements closely spaced about the circumference thereof and defining said bore, said bore at said one end having a diameter no greater than that of a piston ring when the piston ring is sufficiently restrained to effect closure of the part therein, said resilient elements clamping a piston ring and positioning it with respect to the axis of said head in response to the radial pressure developed by the piston ring.

5. In a machine for turning the outer diameter of a parted piston ring, said machine comprising: a rotatable head; and annular collar having a central bore co-axial with said head; support means mounting said collar for reciprocal movement toward and away from said head; a rotatable ring clamping element co-axial with said collar and means for advancing and retracting said element through said collar toward and away from said head; the one end of said collar adjacent said head having a plurality of circumferentially closely spaced resilient radially movable members collectively defining said bore at said one end; said bore being tapered and having a diameter at said one end of said collar less than the outer diameter of a piston ring when the piston ring is sufficiently restrained to effect closure of the part therein and a diameter at the other end of said collar at least as great as the outer diameter of a piston ring when the piston ring is in a free state; said element in advanced position clamping a piston ring against said head; said one end of said collar in advanced position holding the piston ring under circumferential compression while the ring is being clamped against said head; said collar being retracted to disengage the clamped ring to expose it for machining.

6. In a machine for turning the outer diameter of a parted piston ring, said machine having a rotatable head, said head having a ring receiving face and means for advancing and clamping piston rings against said face and a tool for machining the piston rings while clamped against said head, the improvement comprising: positioning means co-axial with said head and characterized by a plurality of independently radially movable resilient fingers, said fingers being closely spaced and arranged in a circle, said fingers each having a free end collectively defining a tapered central bore; the one end of said means defined by said free ends of said fingers in one position being advanced toward said head to be at least co-planar with it; said one end of said bore having a diameter no greater than that of a piston ring when the piston ring is sufficiently restrained to effect closure of the part therein; said fingers resiliently clamping a piston ring and positioning it with respect to the axis of said head in response to the radial pressure developed by the piston ring as the piston ring is advanced through said bore toward said stop by said advancing means.

7. In the method of positioning a parted piston ring for machining its outer diameter, the steps which include: providing a machine having a cutting tool, providing a parted piston ring; simultaneously applying a plurality of radially compressive forces of equal magnitude to said parted piston ring at closely spaced intervals about the entire circumference of said parted piston ring, said forces collectively being only of sufficient magnitude to close the part in said parted piston ring; said forces all acting along radial lines converging at a common point a predetermined spacing from said tool; shifting the individual segments of said parted piston ring and the central axis of said parted piston ring eccentrically of said common point of convergence of said forces in response to variations in the magnitude of the radial pressure exerted by each segment of said parted piston ring operated upon by one of said compressive forces.

References Cited in the file of this patent

UNITED STATES PATENTS

| | | |
|---|---|---|
| 1,849,467 | Okochi | Mar. 15, 1932 |
| 2,140,682 | Strauss | Dec. 20, 1938 |
| 2,752,161 | Smrkar | June 26, 1956 |